United States Patent [19]
Schibinger et al.

[11] Patent Number: 6,092,156
[45] Date of Patent: Jul. 18, 2000

[54] SYSTEM AND METHOD FOR AVOIDING DEADLOCKS UTILIZING SPLIT LOCK OPERATIONS TO PROVIDE EXCLUSIVE ACCESS TO MEMORY DURING NON-ATOMIC OPERATIONS

[75] Inventors: Joseph S. Schibinger, Phoenixville; Douglas E. Morrissey, Allentown, both of Pa.

[73] Assignee: Unisys Corporation, Blue Bell, Pa.

[21] Appl. No.: 08/964,623

[22] Filed: Nov. 5, 1997

[51] Int. Cl.$^7$ .................................................. G06F 13/364
[52] U.S. Cl. .......................... 711/145; 711/141; 711/150; 711/119; 711/130; 710/200
[58] Field of Search ..................................... 711/141, 144, 711/145, 147, 148, 150, 119, 120, 121, 201, 130; 710/200

[56] References Cited

U.S. PATENT DOCUMENTS

| | | | |
|---|---|---|---|
| 4,000,485 | 12/1976 | Barlow et al. | 710/200 |
| 4,392,196 | 7/1983 | Glenn et al. | 709/400 |
| 4,441,155 | 4/1984 | Fletcher et al. | 711/3 |
| 4,464,717 | 8/1984 | Keeley et al. | 711/122 |
| 4,466,059 | 8/1984 | Bastian et al. | 711/122 |
| 4,488,217 | 12/1984 | Binder et al. | 710/200 |
| 4,562,536 | 12/1985 | Keeley et al. | 714/25 |
| 4,586,133 | 4/1986 | Steckler | 711/138 |
| 4,667,288 | 5/1987 | Keeley et al. | 714/25 |
| 4,686,621 | 8/1987 | Keeley et al. | 714/40 |
| 4,875,155 | 10/1989 | Iskiyan et al. | 711/113 |

(List continued on next page.)

FOREIGN PATENT DOCUMENTS

| | | |
|---|---|---|
| 0 752 667 | 1/1997 | European Pat. Off. . |
| WO 95/25306 | 9/1995 | WIPO . |
| 96/35172 | 11/1996 | WIPO . |

OTHER PUBLICATIONS

Hennessy, John L. and David A. Patterson, *Computer Architecture: A Quantitative Approach*, Second Edition, Morgan Kaufman Publishers, 1996, pp 708–721.

M.S. Yousif, et al., "Cache Coherence in Multiprocessor: A Survey," Advances in Computers, vol. 10, 1995, pp. 127–179.

IBM Technical Disclosure Bulletin, "Compact Global Table For Management Of Multiple Caches," vol. 32, No. 7, Dec. 1, 1989, pp. 322–324.

Fred R. Goldstein, "Congestion Control in Frame Relay Networks Using Explicit Binary Feedback," Conference Proceedings, 27–30 Mar. 1991, pp. 558–564.

"Exemplar System Architecture" from http://www.hp/com/wsg/products/servers/exemplar/sxclass/exemplar.htm, Downloaded Feb. 12, 1998 (Date of publication unknown).

Stenstrom et al., "Trends in Shared Memory Multiprocessing", Computer, Dec. 1997, pp. 44–50.

*Primary Examiner*—Glenn Gossage
*Attorney, Agent, or Firm*—Steven B. Samuels; Sterne, Kessler, Goldstein & Fox P.L.L.C.; Mark T. Starr

[57] ABSTRACT

A system and method for avoiding deadlocks when performing non-atomic operations on data in a shared memory accessed by multiple processors that sends messages to implement a split lock. Via the messages, the requesting processor is granted exclusive access to the shared memory so that no other processor may access the same data until after the non-atomic operation has completed. The messages used to avoid the deadlock include a split lock request, a lock message, a grant message, a gone idle message and a release idle message. By using the above messages, the system and method of the present invention accepts requests from multiple processors for exclusive access to memory, orders all of the requests, and awards exclusive access to the first processor to make a request. The system can include a cache memory, associated with a requesting processor, which sends a lock request to the main memory in response to a split lock request from a requesting processor.

25 Claims, 13 Drawing Sheets

U.S. PATENT DOCUMENTS

| | | | |
|---|---|---|---|
| 4,929,940 | 5/1990 | Franaszek et al. | 340/825.02 |
| 4,967,414 | 10/1990 | Lusch et al. | 714/45 |
| 5,016,167 | 5/1991 | Nguyen et al. | 711/151 |
| 5,047,920 | 9/1991 | Funabashi | 711/117 |
| 5,060,136 | 10/1991 | Furney et al. | 711/128 |
| 5,067,071 | 11/1991 | Schanin et al. | 710/113 |
| 5,142,676 | 8/1992 | Fried et al. | 711/152 |
| 5,237,670 | 8/1993 | Wakerly | 710/100 |
| 5,251,308 | 10/1993 | Frank et al. | 711/163 |
| 5,257,361 | 10/1993 | Doi et al. | 711/207 |
| 5,297,269 | 3/1994 | Donaldson et al. | 711/145 |
| 5,327,538 | 7/1994 | Hamaguchi et al. | 710/107 |
| 5,392,416 | 2/1995 | Doi et al. | 711/3 |
| 5,408,629 | 4/1995 | Tsuchiya et al. | 711/151 |
| 5,465,336 | 11/1995 | Imai et al. | 712/216 |
| 5,490,280 | 2/1996 | Gupta et al. | 712/23 |
| 5,497,472 | 3/1996 | Yamamoto et al. | 711/100 |
| 5,499,354 | 3/1996 | Aschoff et al. | 711/129 |
| 5,504,874 | 4/1996 | Galles et al. | 711/145 |
| 5,537,569 | 7/1996 | Masubuchi | 711/121 |
| 5,559,970 | 9/1996 | Sharma | 710/132 |
| 5,568,633 | 10/1996 | Boudou et al. | 711/141 |
| 5,572,704 | 11/1996 | Bratt et al. | 711/121 |
| 5,581,725 | 12/1996 | Nakayama | 711/122 |
| 5,586,274 | 12/1996 | Bryg et al. | 710/108 |
| 5,687,013 | 11/1997 | Henmi | 359/117 |
| 5,717,897 | 2/1998 | McCrory | 707/8 |
| 5,717,942 | 2/1998 | Haupt et al. | 712/13 |
| 5,778,441 | 7/1998 | Rhodehamel et al. | 711/145 |
| 5,802,582 | 9/1998 | Ekanadham et al. | 711/141 |

SYSTEM AND METHOD FOR AVOIDING DEADLOCKS UTILIZING SPLIT LOCK OPERATIONS TO PROVIDE EXCLUSIVE ACCESS TO MEMORY DURING NON-ATOMIC OPERATIONS

CROSS-REFERENCE TO OTHER APPLICATIONS

The following applications have a common assignee and contain some common disclosure:

"A Directory-Based Cache Coherency System," U.S. patent Ser. No. 08/965,004, filed Nov. 5, 1997 and incorporated herein by reference in its entirety;

"Message Flow Protocol for Avoiding Deadlocks," U.S. patent Ser. No. 08/964,606, filed Nov. 5, 1997 and incorporated herein by reference in its entirety;

"Memory Bit Optimization," U.S. patent Ser. No. 08/964,626, filed Nov. 5, 1997 and incorporated herein by reference in its entirety; and "System and Method for Providing Speculative Arbitration for Transferring Data," U.S. patent Ser. No. 08/964,630, filed Nov. 5, 1997 and incorporated herein by reference in its entirety.

BACKGROUND OF THE INVENTION

1. Field of the Invention

The present invention relates generally to multiple processor systems, and more particularly to a technique for avoiding deadlocks within a directory based cache memory system.

2. Related Art

A multiprocessor system typically includes a main memory that is shared by a number of processors, each having its own cache system. A cache memory is generally a buffer between a host processor and main memory. The cache memory is a small, fast memory that is located close to the host processor that stores the most recently accessed instructions or data. The cache increases system performance by storing information which the host processor requires frequently. Storing information in the cache increases system performance by avoiding long delays associated with access to main memory. Each cache system may include multiple levels of caches (e.g., the P6 processor from Intel® has a two level cache memory system).

The multiprocessor system enables data to be shared by multiple processors simultaneously. For example, a multiprocessor system with two processors, A and B, allows both processors to store a copy of data, D, in their respective caches simultaneously. The multiprocessor system, however, introduces a problem of cache coherency. The cache coherency problem arises when processor A modifies its copy of D, while B simultaneously uses its copy of D. Once A modifies its copy of D, the copy of D held in B's cache is no longer valid. This situation is incoherent because if processor B were to read D from its cache, the wrong value of D will be returned. Cache coherency can be achieved by ensuring that B cannot use its copy of D until that copy is made equal to the modified copy held in A's cache.

One way to ensure cache coherency is with a directory protocol. The directory protocol ensures the coherency of all caches within the system by acting as a reference for the operations that the processor may perform on a particular cache line. The cache line represents the smallest unit of data transferred between the memory and the cache. Before being allowed to modify the cache line, the processor must have certain access rights to the cache line. This access may be of different types (e.g., access to read the cache line or access to modify the cache line), and is referred to generally as ownership. In a simple two processor system, for example, ownership of the cache line is granted through a messaging system, wherein processor A requests a particular level of ownership (e.g. read or write/modify) of the cache line presently owned by processor B. To grant ownership, processor B responds to processor A's request message.

Coherency is concerned with the validity of a single cache line, not with the relationship between one cache line and another. For example, following the protocol suggested above, it is possible for a first processor ($P_1$) to perform a write of a first value ($V_1$) followed by a write of a second value ($V_2$), and for a second processor ($P_2$) to capture the old value of $V_1$ and the new value of $V_2$. This relationship between $V_1$ and $V_2$ is referred to as memory consistency.

Memory inconsistency has two causes. First, there can be a delay between $P_1$ obtaining write ownership for $V_1$ and $P_2$ receiving a message to invalidate its copy of $V_1$. This may occur when ownership of the data item is shared (or read-only). Writes are not effective with respect to a particular processor until that processor receives the invalidate message.

The second cause for memory inconsistency occurs when the memory is distributed. In this case, one memory service unit may be busier than another memory service unit. This results in memory not necessarily being accessed in the same order as it is requested. Furthermore, for performance reasons, processors perform requests for data ahead of time and hold the data until they are needed. This results in data items being obtained in an order that differs from the program order. For more detail concerning memory consistency see Hennessy & Patterson, *Computer Architecture a Quantitative Approach,* Second Edition, Morgan Kaufmann Publishers, 1996, pp. 708–721.

One technique used to establish memory consistency uses a "locking" operation. In this technique, a writing processor "locks" a shared data to prevent other processors from accessing the data, writes to the shared data, and then "unlocks" the shared data for use by the other processors. In a similar manner, a reading processor "locks" a shared data, reads the shared data, and then "unlocks" the shared data.

The locking operation thus described synchronizes the memory. To begin with, the locking operation functions as a start barrier. The processor executing the locking operation must wait until every other processor is finished with the data. Hardware mechanisms that detect whether writes have been performed ensure that reading processors have updated data and that writing processors do not over-write data that another processor is reading.

The locking operation also functions as an end barrier. A processor is not permitted to execute newer instructions until the locking operation has completed. This prevents reading processors from obtaining and holding old data before acquiring the lock.

A deadlock can occur when a processor performs a non-atomic operation on data that is simultaneously accessed by a second processor. An atomic operation is an operation in which a processor reads or writes to a memory location while preventing any another processor from reading or writing to that memory location. Non-atomic operations are operations in which the cache lines being operated upon by the processor can be read or written to by another processor before the operation completes. A non-atomic operation can occur, for example, when the data being operated on crosses a cache line boundary. That is, the data being modified is located in two different lines of the cache. For example, if data is stored in the cache such that two cache lines must be read to access the data, the operation crosses the cache line boundary. A processor accessing the data may perform an atomic operation on the first cache line, but the second cache line can still be accessed by another processor in the interim.

One way to solve the deadlock problem is to require all other processors to go idle once the processor starts the non-atomic operation. Systems typically accomplish this by generating a "lock" signal which is transmitted to the other processors over a system bus. The "lock" signal prevents any other processor from accessing the bus while the "lock" is asserted. Implementing this in the multiprocessor system, however, can be problematic if the system contains more than one bus. Moreover, if the processor does not provide a mechanism for supplying the "lock" signal, the above solution cannot be implemented.

What is needed is a system and method for performing non-atomic operations in a multiprocessor system that avoids the problem of deadlock.

SUMMARY OF THE INVENTION

Briefly stated, the present invention is directed to avoiding a deadlock in a multiprocessor system when a processor performs a non-atomic operation on data that can be simultaneously accessed by a second processor. A deadlock is avoided through a split lock operation comprising a series of messages designed to give a processor exclusive access to the memory so that no other processor may access the same data until after the non-atomic operation has completed. The messages used to avoid the deadlock include a split lock request, a lock message, a grant message, a gone idle message and a release idle message. By using the above messages, the method of the present invention accepts requests from multiple processors for exclusive access to memory, orders all of the requests, and awards exclusive access to the first processor to make a request.

BRIEF DESCRIPTION OF THE FIGURES

The present invention will be described with reference to the accompanying drawings, wherein.

DETAILED DESCRIPTION OF THE PREFERRED EMBODIMENTS

The preferred embodiment of the present invention is discussed in detail below. While specific configurations are discussed, it should be understood that this is done for illustration purposes only. A person skilled in the relevant art will recognize that other components and configurations may be used without parting from the spirit and scope of the invention. Furthermore, it should be understood that embodiments of the present invention can be implemented in hardware, software or a combination thereof. In such embodiment, the various component and steps would be implemented in hardware and/or software to perform the functions of the present invention. Any computer software language and/or hardware components can be employed in such embodiments of the present invention.

Figure 1:
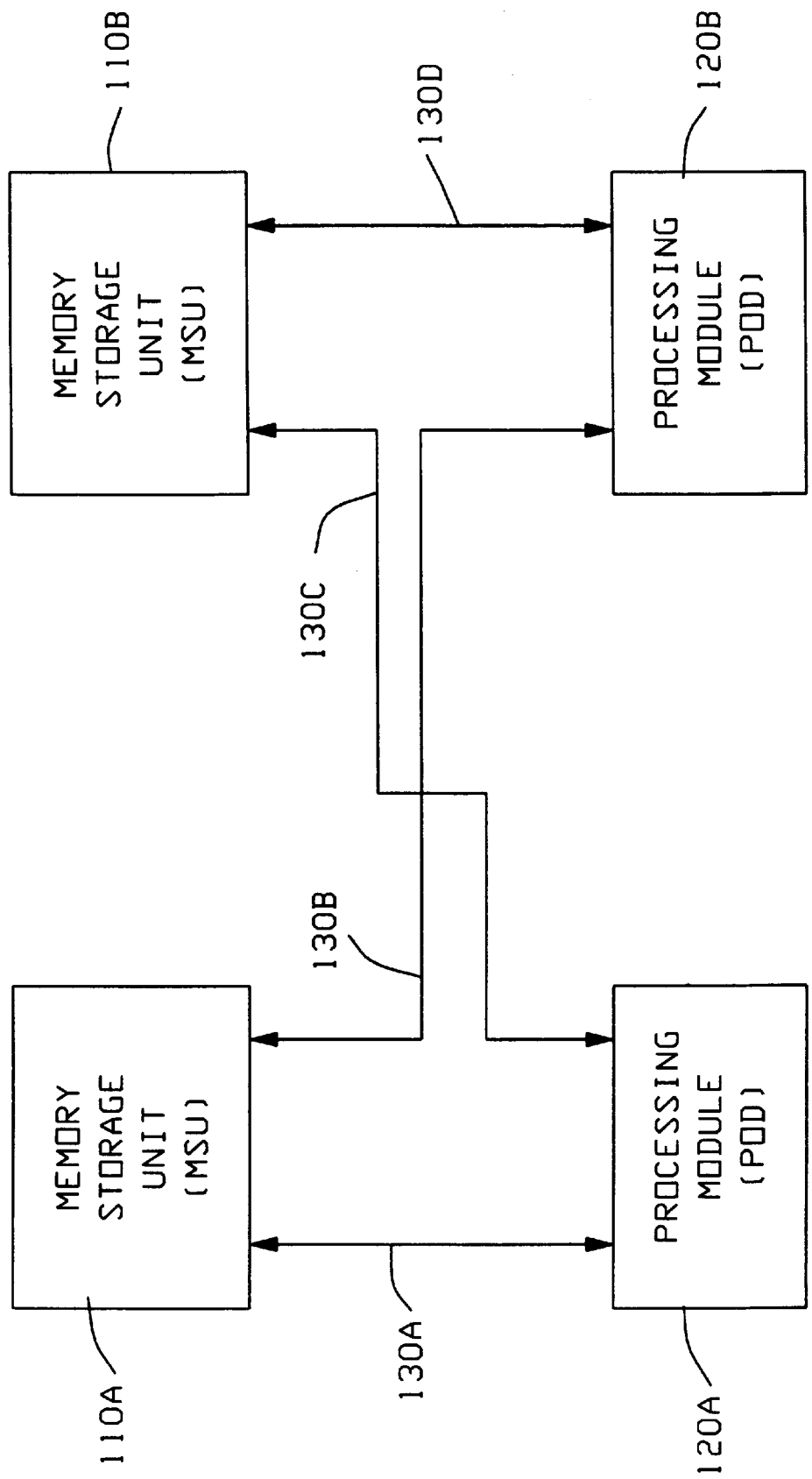
FIG. 1 is a block diagram of a system platform environment according to a preferred embodiment of the present invention.

Prior to describing the invention in detail, a description of an example system processing platform is provided. FIG. 1 is a block diagram of a system processing platform 100 in which the present invention is used. System processing platform 100 is useful for managing data flow among multiple processing systems and multiple memory storage systems. System processing platform 100 comprises one or more memory storage units (MSU) 110 (shown as MSU 110A and MSU 110B) and one or more processing modules (POD) 120 (shown as POD 120A and POD 120B). Customers can grow their system processing platform 100 by adding additional MSUs 110 and PODs 120.

Each MSU 110 is connected to each POD 120 via a MSU interface (MI) bus 130 (shown as MI bus 130A, 130B, 130C, and 130D). MI bus 130 is a point-to-point interface that has separate address/function and data buses. MI bus 130 is comprised of a uni-directional control bus, a bi-directional request bus, and a bi-directional data bus. The request bus runs at system clock frequency (SYSCLK) while the data bus runs source synchronous at two times the system clock frequency. In a preferred embodiment of system processing platform 100, system clock frequency is 100 megahertz (MHZ).

POD 120 has direct access to data in any MSU 110 via one of MI bus 130. For example, MI bus 130A allows POD 120A direct access to MSU 110A and MI bus 130C allows POD 120A direct access to MSU 110.

Figure 2:
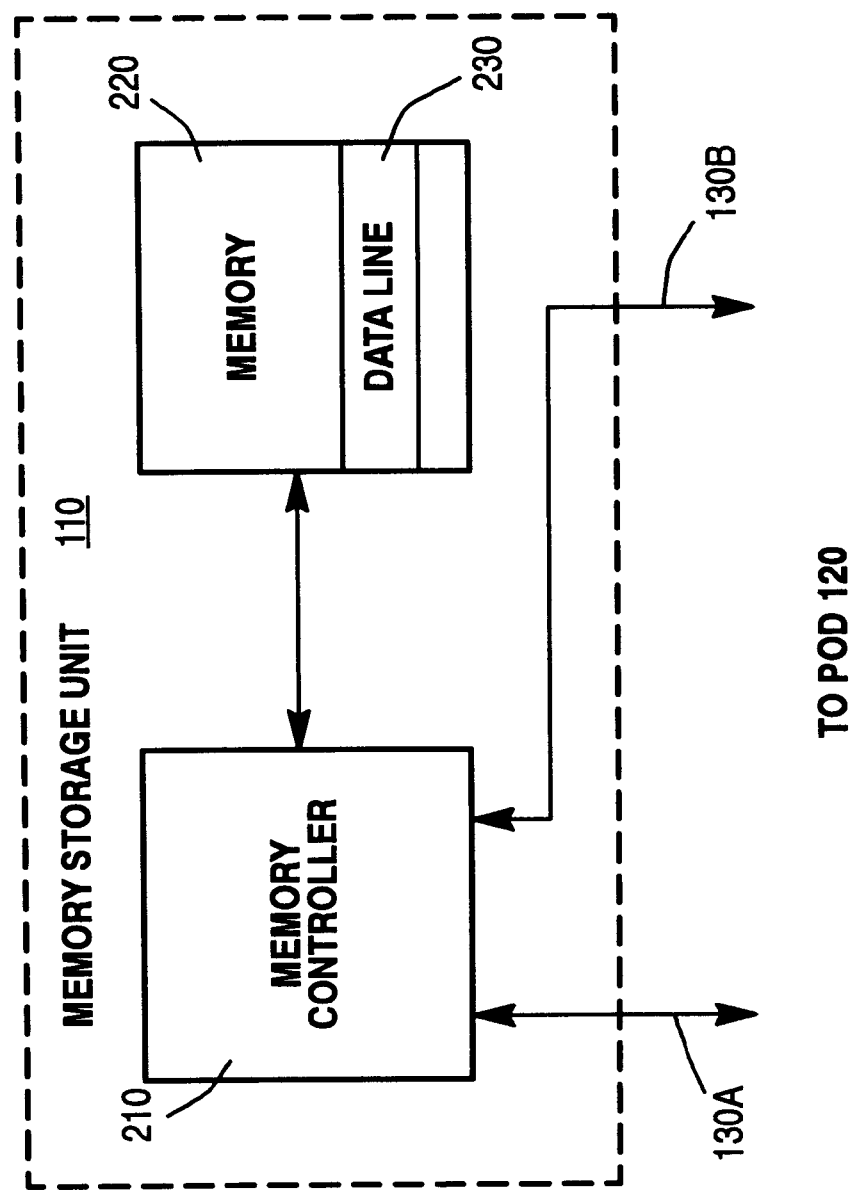
FIG. 2 illustrates an embodiment of a memory storage unit.

FIG. 2 illustrates memory storage unit (MSU) 110 in further detail. MSU 110 includes a memory controller 210 and a memory 220. Memory 220 comprises a plurality of data lines 230. Each data line 230 is the smallest quantum of data transferred among MSUs 110 and PODs 120 in system platform 100. In system processing platform 100, data line 230 is equivalent to 8 data words or 64 bytes. Memory controller 210 operates as the memory manager of memory 220. Memory controller 210 receives the control and address lines via MI bus 130 from POD 120. Memory controller 210 controls and monitors the status of each data line 230 in a manner discussed in detail below.

Figure 3:
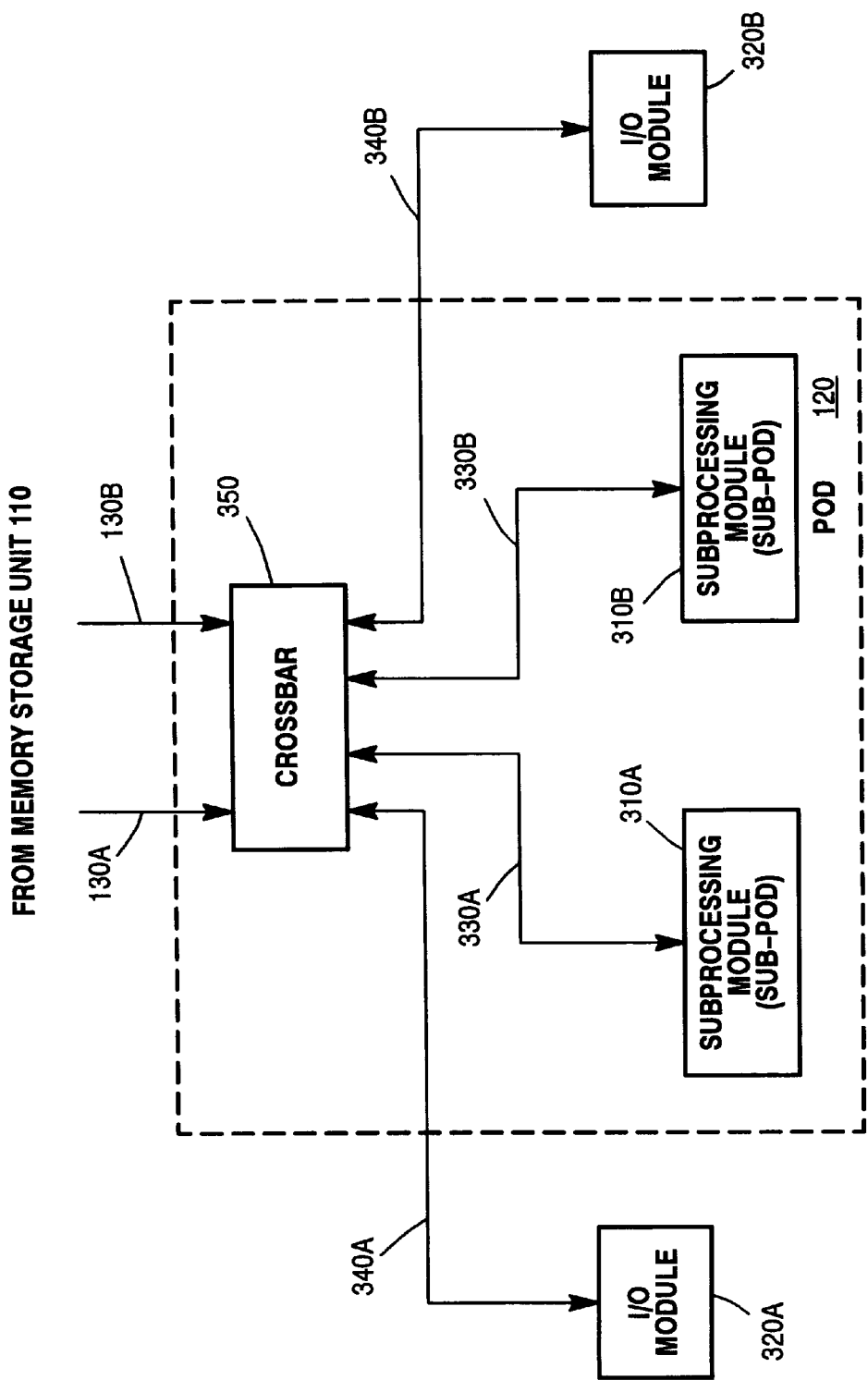
FIG. 3 illustrates an embodiment of a processing module.

A detailed block diagram of POD 120 is shown in FIG. 3. POD 120 comprises a crossbar 350, one or more sub-processing modules (sub-POD) (shown as sub-POD 310A and sub-POD 310B), and one or more input/output (I/O) modules 320 (shown as I/O module 320A and I/O module 320B). In system processing platform 100, each POD 120 contains two sub-PODs 310 and two I/O modules 320.

Crossbar 350 connects sub-POD 310 and I/O module 320 to MSU 110 via MI bus 130. Sub-POD 310 (shown as sub-POD 310A and sub-POD 310B) is connected to crossbar 350 via interface 330 (shown as interface 330A and interface 330B). Crossbar 350 interfaces I/O module 320 (shown as I/O module 320A and I/O module 320B) via interface 340 (shown as interface 340A and interface 340B). In system processing platform 100, MI bus 130 and interface 330 transfer data at equivalent transfer rates. Interface 340, between I/O module 320 and crossbar 350, has a similar configuration to MI bus 130 and interface 330, but operates at half the transfer rate.

Figure 4:
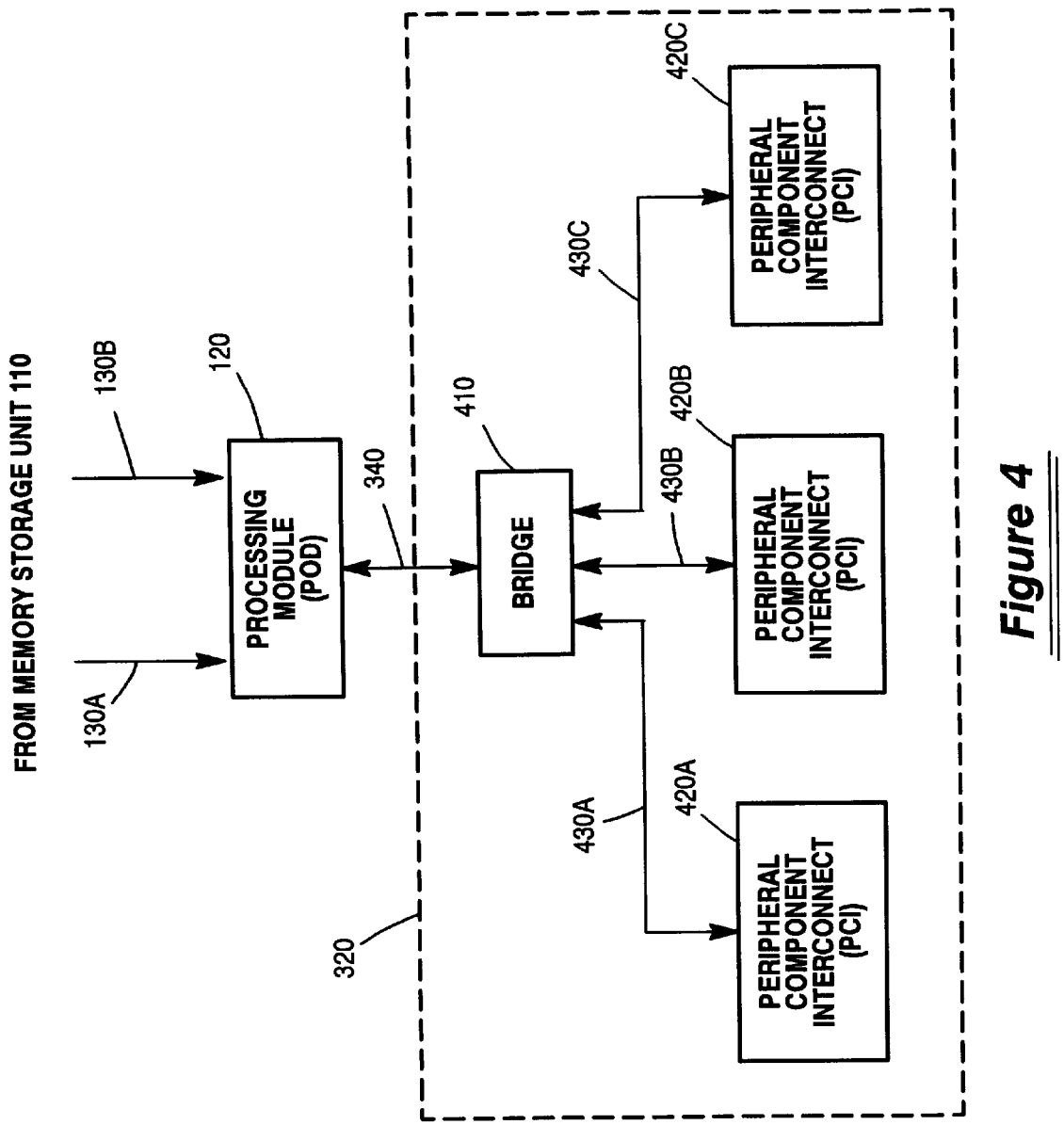
FIG. 4 illustrates an embodiment of an input/output (I/O) module.

I/O module 320 is shown in FIG. 4. I/O module 320 functions as an interface between POD 120 and one or more I/O devices (not shown) connected to I/O module 320. I/O module 320 comprises a bridge 410 that interconnects one or more peripheral component interconnects (PCI) (shown as PCI 420A, PCI 420B, and PCI 420C) via bus 430 (shown as bus 430A, bus 430B, and bus 430C). Bridge 410 is also connected to crossbar 350 in POD 120 via bus 340 as shown in FIG. 3. Bridge 410 functions as a switch between bus 340 and bus 330 that allows POD 120 access to each PCI 420.

Peripheral component interconnect (PCI) 420 is an I/O bus that connects various I/O devices (not shown) to I/O module 320. In a preferred embodiment of system processing platform 100, each PCI 420 can support up to four devices. These devices include, but are not limited to, SCSI controllers, LAN controllers, and video controllers, etc.

Figure 5:
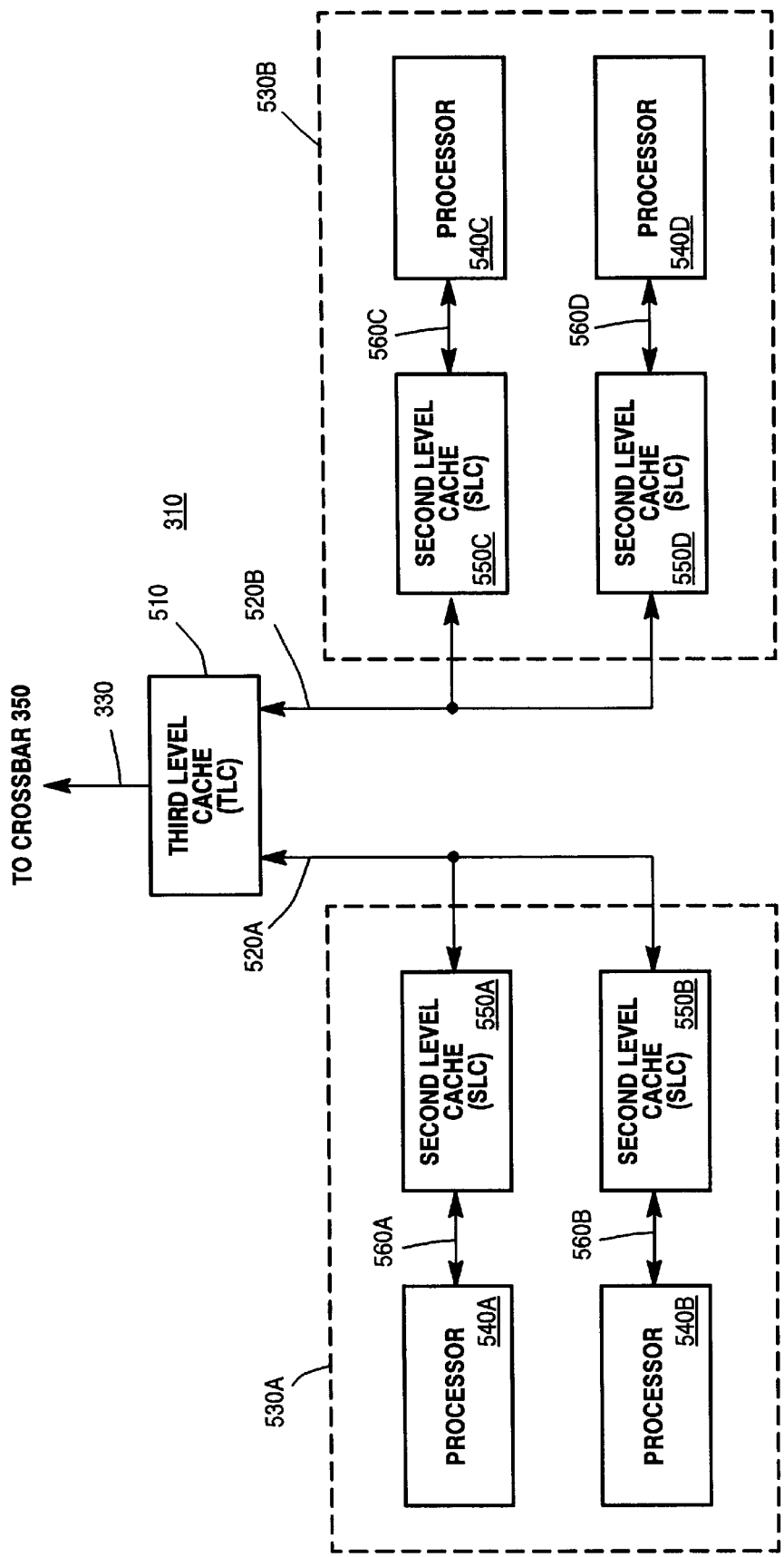
FIG. 5 illustrates an embodiment of a sub-processing module.

A block diagram of sub-POD 310 is shown in FIG. 5. Sub-POD 310 comprises a third level cache (TLC) 510 and one or more coherency domains 530 (shown as coherency domain 530A and coherency domain 530B). TLC 510 is connected to each coherency domain 530 via bus 520 (shown as bus 520A and bus 520B). TLC 510 maintains coherency among each coherency domain 530.

Each coherency domain 530 comprises two or more second-level caches (SLC) 550 (shown as SLC 550A and SLC 550B in coherency domain 530A and as SLC 550C and SLC 550D in coherency domain 530B) and a processor 540 connected to each SLC 550 (shown as processor 540A and processor 540B in coherency domain 530A and as processor 540C and processor 540D in coherency domain 530B) via bus 560 (shown as bus 560A and bus 560B in coherency domain 530A and as bus 560C and bus 560D in coherency domain 530B). Each bus interface 520 supports up to two processor/SLC (540/550) configurations in a coherency domain 530. Processor module 540 can contain, for example, one of a Deshutes style P6, a Merced style P7, a Voyager style 2200, or a Capricorn style A series instruction processor. All four types of instruction processors are well known to person(s) skilled in the relevant art(s).

SLCs 550 in each coherency domain 530 maintain coherence among themselves as well as within their own coherency domain. This is accomplished by sharing bus 520 and following a snoopy-based coherence. According to a snoopy-based coherence, each SLC 550 "snoops" request bus 520 to ascertain the status of data line 230, and to update the status of a data line stored therein, if necessary. A more detailed discussion of the snoopy protocol is contained in (co-pending) U.S. patent application Ser. No. 08/965,004, filed Nov. 5, 1997, entitled, "A Directory-Based Cache Coherency System," the entirety of which is incorporated herein by reference.

Figure 6:
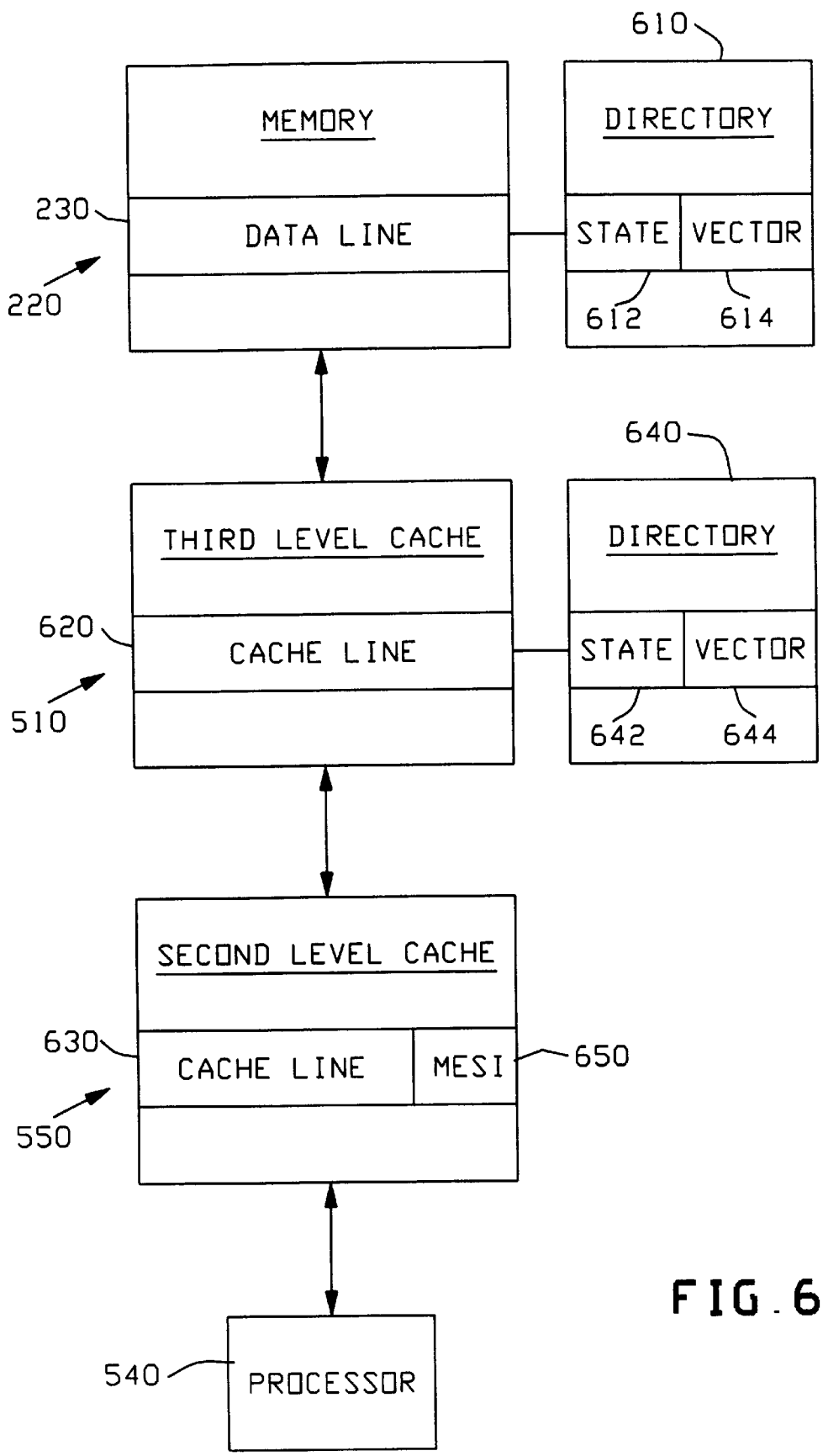
FIG. 6 illustrates an embodiment of a directory-based memory and cache system.

PODs 120 and MSUs 110 cooperate to produce a coherent memory system. In a preferred embodiment of the present invention, the coherency scheme of system processing platform 100 is a directory-based, ownership protocol. FIG. 6 illustrates the directory-based ownership protocol used in system processing platform 100. Memory 220 and each level of cache (i.e., TLC 510, SLC 550, etc.) allow for a directory protocol for maintaining coherence. As shown in FIG. 6, memory 220 has a memory directory 610, TLC 510 has a TLC directory 640, and SLC 550 has an SLC directory 650, entitled MESI (Modified Exclusive Shared Invalid).

Each cache 510 and 550 includes a memory for storing a data line, referred to as a cache line (shown as cache line 620 in TLC 510 and as cache line 630 in SLC 550). A cache line is a copy of the data line that exists in one or more caches 510, 550. The copy may be a "true copy" of the data line, in which case the data has not been modified within the particular cache and is identical to the data in the main memory, or a "modified copy" of the data line, in which case the data has been modified within the particular cache but has not been updated to the main memory.

In directory 610, information about each data line 230 is monitored and updated using a state 612 and a vector 614. State 612 maintains information concerning the status of access granted to a requester with respect to data line 230. Such status may include present, shared, and exclusive. Present status indicates that data line 230 only exists in memory 220. Shared status indicates that a read only copy of data line 230 exists in one or more PODs 120. This indicates that these one or more PODs 120 may freely read a copy of data line 230. Exclusive status indicates that a single requester has been granted write access to data line 230. This indicates that only the single requestor has the right to modify data line 230. Vector 614 is a pointer identifying each location in which data line 230 exists.

In TLC directory 640, information about each cache line 620 is monitored and updated using a state 642 and a vector 644. State 642 maintains three pieces of information concerning the status of cache line 620. This information includes ownership rights, data status, and bus rights. Vector 644 points to one or more locations where cache line 620 exists.

Ownership rights may include exclusive, shared, and unknown. Exclusive rights indicate that TLC 510 has exclusive rights (i.e., write access) to cache line 620 and this exclusive right coincides with the corresponding status of data line 230 in memory 220. Shared rights indicate that memory 220 associates cache line 620 as being shared (i.e., read only access). Unknown rights indicate that ownership rights for cache line 620 are unknown.

Data status for TLC directory 640 may include no data, modified data, or clean data. No data indicates that no data is present in cache line 620. Modified data means that the data in cache line 620 has been modified. Modified data must be written back to memory 220. Clean data indicates that the data in cache line 620 has not been modified.

Bus rights indicate whether rights have been granted to one of bus 520A and 520B. Bus rights also include a state and vector (both state and vector are not shown). Bus rights may include states of exclusive, shared, or unknown. Exclusive rights indicate that exclusive ownership belongs to SLC 550 associated with one of bus 520A and 520B. Shared rights indicate that rights have been granted to both bus 520A and 520B. Unknown rights indicate that it is unknown as to which bus has rights.

In SLC directory 650, only the state of cache line 630 is maintained. The states may include modified, exclusive, shared, or invalid. Modified status indicates that one of the associated SLC 550s has been granted exclusive ownership rights to the data in cache line 630 and has subsequently modified the data. Exclusive status indicates that one of the associated SLC 550s has been granted exclusive ownership rights to the data in cache line 630 and that data has not been modified. Shared status indicates that one or more of the associated SLC 550s have shared ownership rights to the data in cache line 630. Invalid status indicates that the copy of data line 230 found in cache line 630 in SLC 550 is no longer valid due to a write performed on data line 230 in another device.

Caching schemes were developed to reduce the time required by a processor, such as processor 540, to read data line 230 in memory 220. Caching systems, such as the one used in system processing platform 100, must maintain coherent data within each of memory 220, TLC 510, and SLC 550 to enable system processing platform 100 to perform properly and efficiently.

Coherency is a term well known in the art and governs the accessing of data in systems with multiple memory and processing devices. A coherent system is one in which only one device has write access to a particular data line 230 at any given time while multiple devices may have read access to a particular data line 230. In other words, coherency requires that a read of a data line return the value of that data line most recently written, and a write of a data line invalidate all copies of that data line possessed by all agents having read access.

With respect to processing system platform 100, coherency means that before POD 120 allows one of its requesters to modify cache line 620 or 630 within any of caches 510 and 550, POD 120 must obtain exclusive ownership permission from MSU 110 for this data. Once exclusive ownership has been granted, POD 120 requesters are allowed to change cache line 620 without interacting with MSU 110. When POD 120 is through with cache line 620, cache line 620 is written back to MSU 110.

MSU 110 keeps track of cache line 620 state information on TLC 510 and I/O bus interface 340. MSU 110 does this by using directory structure 610. Directory 610 maintains information as to whether MSU 110, a particular TLC 510, or a particular I/O bus interface 340 owns data line 230. Directory 610 will maintain information as to which if any, of TLCs 510 have outstanding copies of data line 230 or if a particular I/O device has a coherent copy outstanding. Directory 610 will also indicate whether a particular data line 230 contains an uncorrectable error.

The coherency scheme of system processing platform 100 allows for only one requester to have exclusive ownership at a time and coherency is enforced on a cache line basis. Thus, if another TLC 510 or I/O bus interface 340 needs to have exclusive or shared ownership to a modified cache line 620 or 630, it is the responsibility of MSU 110 to request the original exclusive owner to return cache line 620 or 630 back to MSU 110 to route the new data to the requester. If the requestor wants to modify cache line 620 or 630, the original owner will purge (invalidate) corresponding cache line 620 or 630 from its caches. Then, if the original owner needs access to that particular cache line 620 or 630 again, it will be forced to go to MSU 110 for the latest copy. If a requestor wants to read data line 230, the original owner is allowed to keep a copy of the corresponding cache line 620 or 630. In either case, the original owner has lost the privilege to modify any of the data in the corresponding cache line 620 or 630, and in order to do so, it must again request exclusive ownership from MSU 110.

The coherency scheme of system processing platform 100 is further described in (co-pending) U.S. application Ser. No. 08/965,004, filed Nov. 5, 1997, entitled, "A Directory-Based Cache Coherency System."

The present invention is described in terms of the above example environment. Description in these terms is provided for convenience only. It is not intended that the invention be limited to application in this example environment. In fact, after reading the following description, it will become apparent to person(s) skilled in the relevant art(s) how to implement the invention with other memory storage units and processing module configurations. For example, the present invention has applicability in any system that utilizes a memory hierarchy that is connected to a plurality of processors. Multiple level caching, however, is not required to implement the present invention.

The present invention, called a split lock, is directed towards avoiding deadlocks in a directory based multiprocessing system without relying upon a lock line from processor 540. The split lock operates through a series of messages that prevent a deadlock from occurring when two processors simultaneously access the same data that crosses a cache line boundary.

The following section describes the various messages used by the present invention in performing the split lock operation. The present invention generates the following specific messages: a split lock request, a lock message, a grant message, a gone idle message, and a release idle message. Each of these messages is described in further detail below.

A split lock request is transmitted by processor 540 (FIG. 5) to TLC 510 via bus 520. The split lock request informs TLC 510 that processor 540 requires the split lock operation. A split lock operation is required when a processor needs to access data that is stored in more than one cache line.

A lock message is generated by TLC 510 in response to the split lock request. The lock message is transmitted to MSU 110 via bus 330. A grant message is generated by MSU 110 in response to the lock message. The grant message is used by each TLC 510 to determine whether it has been granted permission to perform the split lock operation.

A gone idle message is generated by all TLCs 510 that are not granted the split lock request. The gone idle message is used by the particular TLC 510 performing the split lock operation to ensure that all other TLCs 510 cannot access memory.

A release idle message is generated by the particular TLC 510 that has been granted the split lock request. The release idle message is generated by the particular TLC 510 after completing the split lock operation. The release idle message is used to signal all TLCs 510 that the split lock operation is complete.

Figure 7:
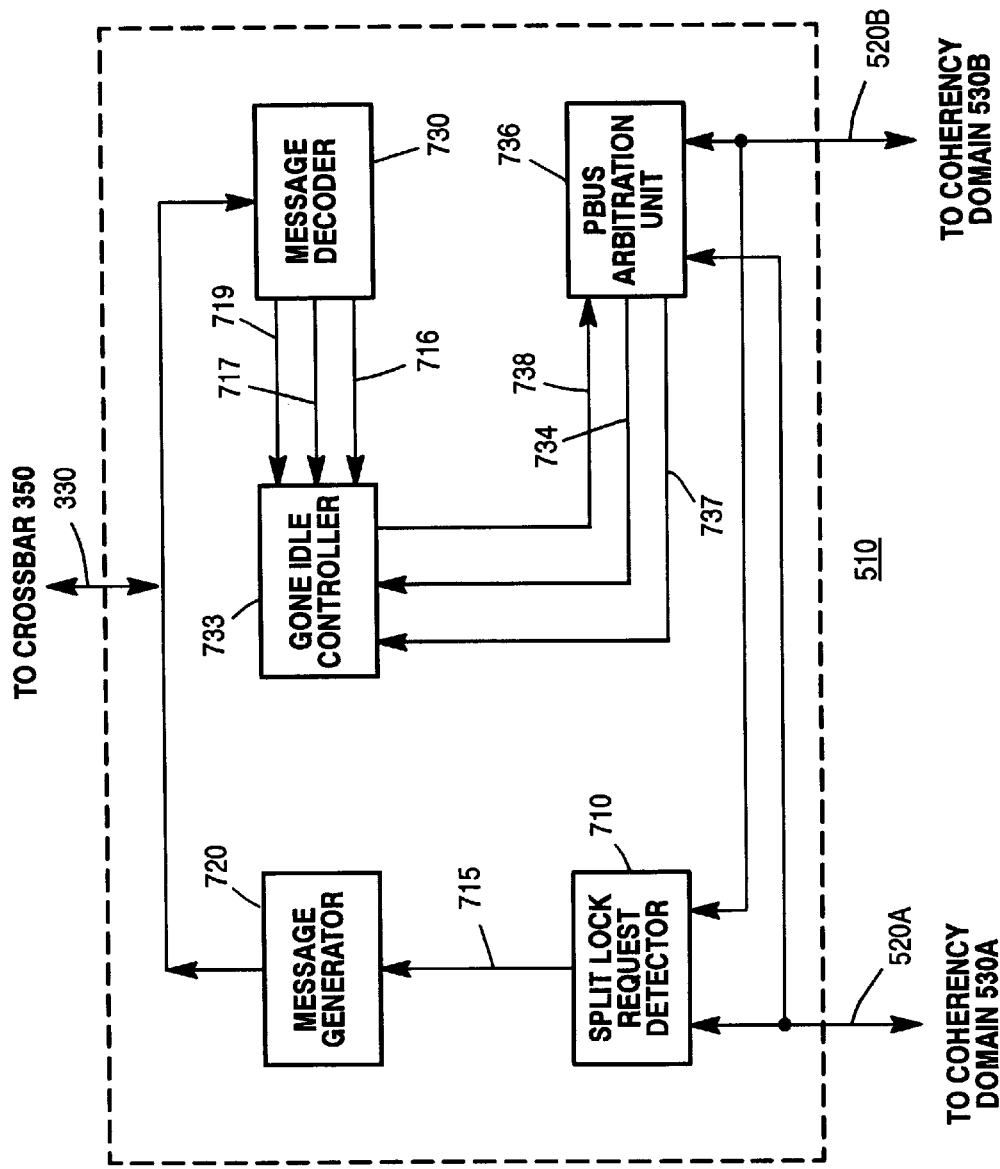
FIG. 7 illustrates a block diagram of a third level cache as embodied in the present invention.

The following section describes the functional components comprising TLC 510 as embodied in the present invention. FIG. 7 shows a block diagram of TLC 510 as embodied in the present invention. FIG. 7 is a conceptual illustration of TLC 510 that allows an easy explanation of the present invention. That is, one or more of the blocks may be performed by the same piece of hardware or module of software. It should also be understood that embodiments of the present invention can be implemented in hardware, software, or a combination thereof. In such an embodiment, the various components and steps would be implemented in hardware and/or software to perform the functions of the present invention.

TLC 510 includes a split lock request detector 710, a message generator 720, a message decoder 730, a gone idle controller 733, and a processor bus (Pbus) arbitration unit 736. Split lock request detector 710 detects the split lock request by decoding an operation field within the split lock request. Split lock request detector 710 generates a source identifier that is associated with the split lock request. The source identifier uniquely identifies each processor 540 that generates the split lock request. Split lock request detector 710 transmits a signal 715 to message generator 720 for each split lock request that is detected.

For split lock operation, message generator 720 generates the lock message, the gone idle message, and the release idle message. Message generator 720 generates the lock message in response to each signal from split lock request detector 710. Furthermore, each of the lock messages includes the source identifier from the corresponding split lock request. Message generator 720 transmits the lock message to MSU 110 via bus 330.

Message generator 720 generates the gone idle message after bus 520 has been idled. The gone idle message is transmitted to each TLC 510. Furthermore, each gone idle message includes the source identifier for the particular TLC 510 that transmits the message. The gone idle messages are collected by the particular TLC 510 that is performing the split lock operation.

Message generator 720 generates the release idle message after the particular TLC 510 that performed the split lock operation has completed the split lock operation.

Message decoder 730 decodes messages received from MSU 110 via bus 330. Message decoder 730 detects the message type by decoding an operation field within the message. During split lock operation, message decoder 730 decodes the grant messages, the gone idle messages, and the release idle messages. Upon decoding the first grant message, message decoder 730 compares the source identifier within the grant message to the source identifier associated with the first split lock request received from processor 540. Message decoder 730 transmits a signal 716 indicating whether or not the source identifier within the grant message is equal to the source identifier associated with the first split lock request received from processor 540.

Message decoder 730 detects the gone idle message received via bus 330. Upon detecting the gone idle message, message decoder 730 transmits a signal 719 to gone idle controller 733 indicating such.

Message decoder 730 detects the release idle message received via bus 330. Upon detecting the release idle message, message decoder 730 transmits the signal 717 to gone idle controller 733 indicating such.

Gone idle controller 733 initiates and terminates the idle state for bus 520. Gone idle controller 733 initiates the idle state upon receiving the signal 716. Gone idle controller 733 checks for messages from all other TLCs 510. Upon receiving the gone idle message from all other TLCs 510, gone idle controller 733 signals Pbus arbitration unit 736 to proceed with the split lock operation. Upon receiving the signal 716, gone idle controller 733 signals Pbus arbitration unit 736 to idle bus 520. Pbus arbitration unit 736 idles bus 520 upon receiving a signal 738 from gone idle controller. Pbus arbitration unit 736 transmits a signal 737 to gone idle controller 733 after bus 520 is idle.

Gone idle controller 733 terminates the idle state after the split lock operation has been completed. Gone idle controller 733 terminates the idle state after receiving a signal 734 from Pbus arbitration unit 736. Signal 734 indicates that the split lock operation has completed. The idle state is terminated by a signal 717 from message decoder 730. The signal 717 indicates that the release idle message has been received.

Figure 8:
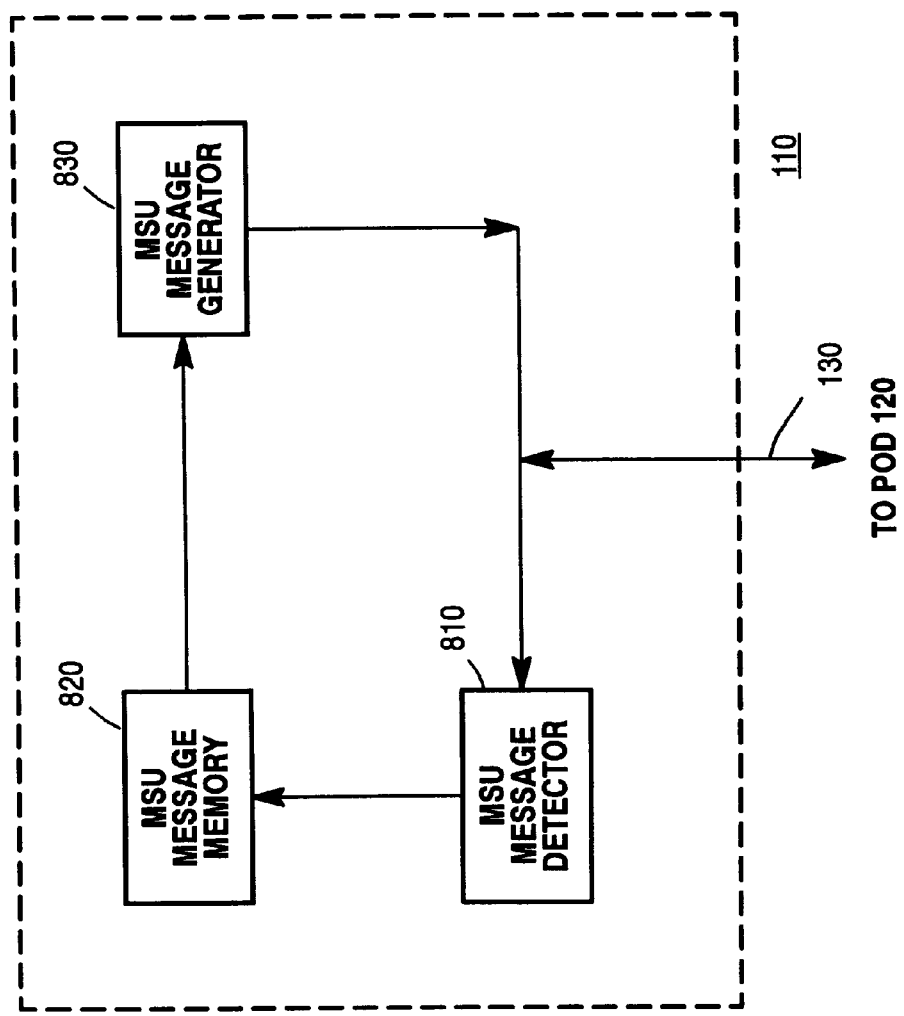
FIG. 8 illustrates a block diagram of a memory storage unit as embodied in the present invention.

The following section describes the functional components of MSU 110 according to a preferred embodiment of the present invention. FIG. 8 shows a block diagram of MSU 110 as embodied in the present invention. In particular, FIG. 8 shows a portion of the components of memory controller 210 that accepts and routes messages between MSU(s) 110 and POD(s) 120. MSU 110 includes an MSU message detector 810, an MSU message memory 820, and an MSU message generator 830. In one embodiment of the present invention, MSU message detector 810, MSU message memory 820 and MSU message generator 830 all reside within memory controller 210. In another embodiment, MSU message detector 810 and MSU message generator 830 reside within memory controller 210 and MSU memory 820 is a component of memory 220. MSU 110 decodes the lock message, the gone idle message, and the release idle message. For each message type decoded, MSU 110 broadcasts to each TLC 510 the grant message, the gone idle message, and the release idle message respectively. All message types are received by MSU 110 via bus 130. MSU message detector 810 detects the message type by decoding the operation code within the message. The source identifier associated with the received message is stored within the MSU message memory 820 in the order in which they were received. MSU message generator 830 generates a corresponding message type for each source identifier contained within MSU message memory 820. Each message generated by MSU message generator 830 contains the associated source identifier. Each corresponding message is then broadcast to the system via bus 130.

Figure 9:
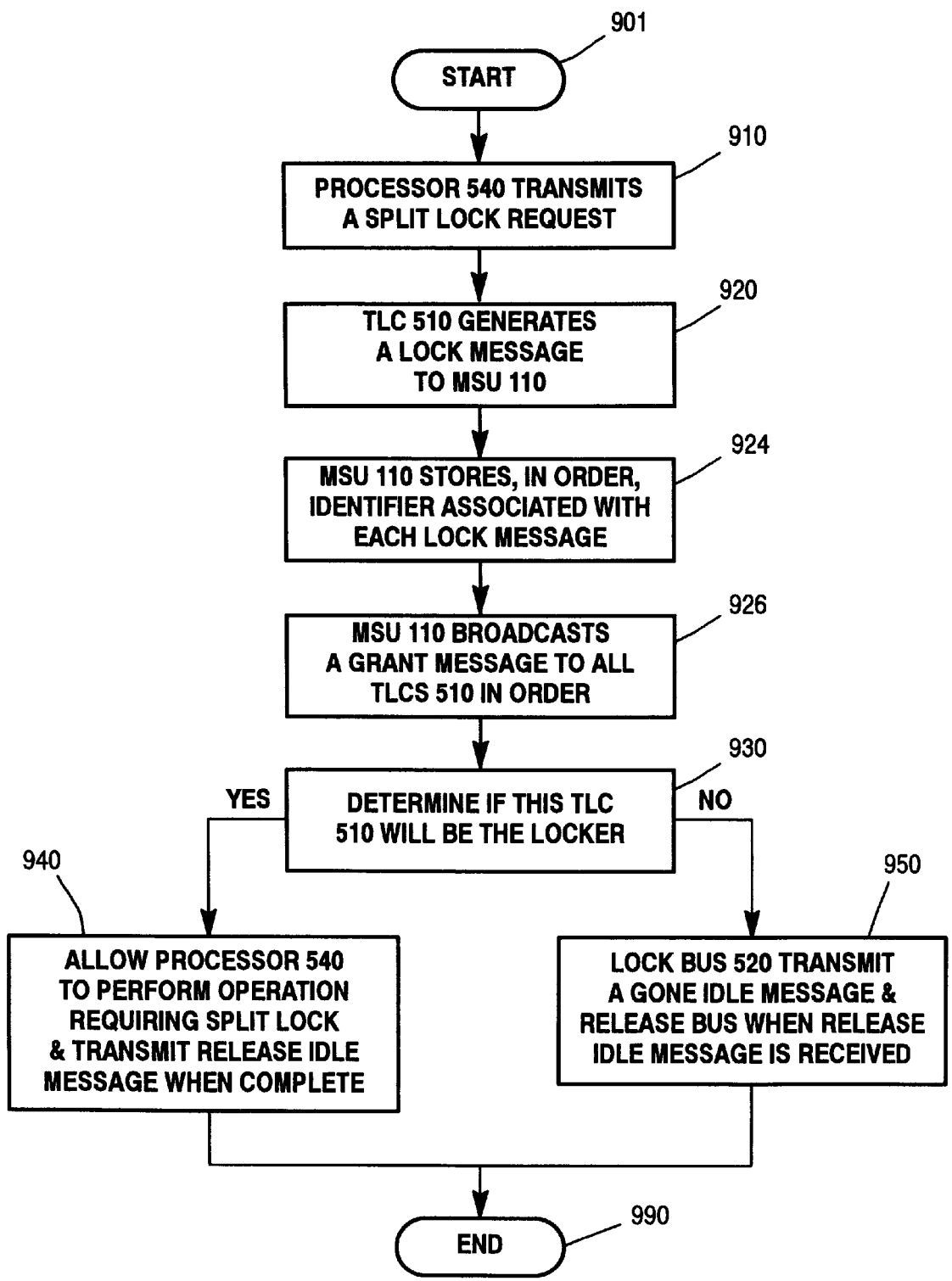
FIG. 9 illustrates a flowchart of the overall split lock operation.

The following section describes how the overall split lock operation is performed. FIG. 9 is a flowchart showing the complete split lock operation. In a step 910, the split lock operation begins when a particular processor 540 sends a split lock request to TLC 510. In a step 920, TLC 510 sends a lock message that incorporates the source identifier of the processor 540 requesting the split lock operation to MSU 110.

In a step 924, MSU 110 stores, in the order received, the source identifier contained within each of the lock messages sent by TLC 510. In a step 926, MSU 110 then broadcasts or forwards a grant message to all TLCs 510 in the order that the lock messages were received.

In a step 930, TLC 510 determines whether it has been chosen as the locker. That is, the grant message returned from MSU 110, along with a source identifier, indicates that a particular TLC 510 has the right to perform the split lock operation. If a TLC 510 determines that it has been chosen to be the locker, processing continues at a step 940. Otherwise, processing continues at a step 950.

In step 940, TLC 510 allows processor 540 to proceed with the split lock operation. When processor 540 has completed the operation, TLC 510 transmits the release idle message, which indicates that the split lock operation for this particular TLC 510 has completed.

In step 950, each TLC 510 not chosen as the locker idles bus 520. After bus 520 has been idled, TLC 510 transmits the gone idle message to the locker and waits to receive a release idle message from the locker. TLC 510 releases bus 520 from the idle state once the release idle message is received.

Figure 10:
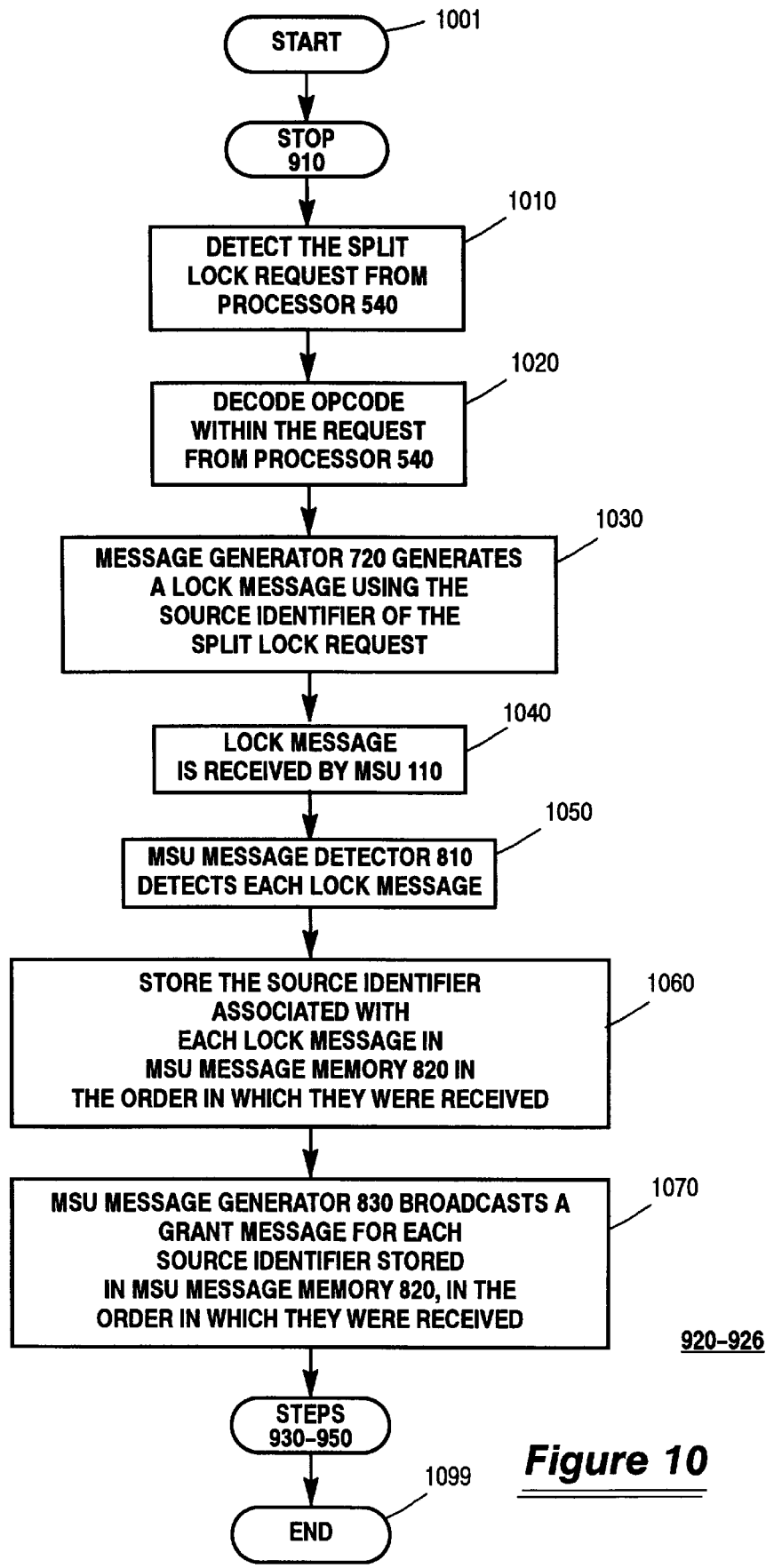
FIG. 10 illustrates a flowchart of the generation of a split lock request message.

FIG. 10 is a flowchart describing the portion of the split lock operation that generates lock messages. In a step 1010, split lock request detector 710 detects the split lock request transmitted from processor 540 via bus 520. In step 1020, split lock request detector 710 decodes the operation code and source identifier within the split lock request transmitted by processor 540. In a step 1030, message generator 720 transmits a lock message to MSU 110 that incorporates the source identifier decoded from the split lock request in step 1020. In a step 1040, MSU 110 receives the lock message from message generator 720. In step 1050, MSU message detector 810 detects each lock message transmitted in step 1030.

In a step 1060, the source identifier associated with each lock message is stored within the MSU message memory 820 in the order in which the lock messages were decoded by MSU 110. In a step 1070, MSU message generator 830 broadcasts a grant message for each source identifier stored in MSU message memory 820. The grant messages are broadcast in the same order in which the lock messages were received.

Figure 11:
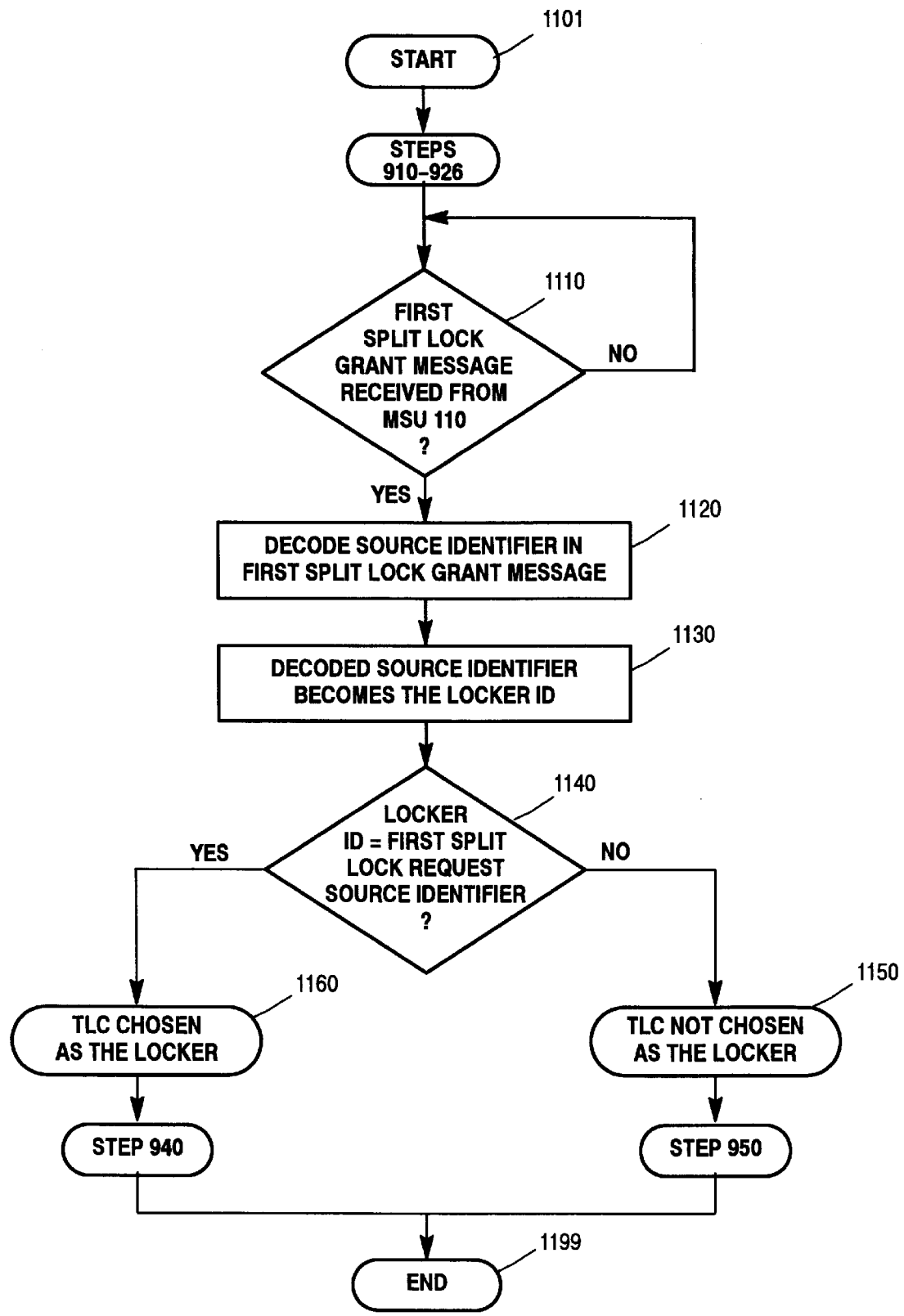
FIG. 11 illustrates a flowchart showing a portion of the split lock operation that determines which processor will be granted the split lock operation.

FIG. 11 is a flowchart showing the portion of the split lock operation that determines which processor 540 will be granted the split lock operation. In a decision step 1110, message decoder 730 detects whether the first grant message broadcast by MSU 110 has been received. If the first grant message has not been received, processing continues at step 1110. Once the first grant message has been received, processing continues at a step 1120.

In step 1120, message decoder 730 decodes the source identifier within the first split lock grant message. In a step 1130, the source identifier decoded at step 1120 is loaded into the Locker Identification (ID). The Locker ID identifies the particular TLC 510 that has been granted the split lock request. The particular TLC 510 identified by the Locker ID is referred to as the locker.

In a decision step 1140, the locker identifier or ID is compared to the source identifier associated with the first split lock (message) request transmitted by this particular TLC 510. If the locker identifier is not equal to the source identifier associated with this particular TLC's 510 split lock request, this particular TLC 510 has not been chosen as the locker at step 1150. If the locker identifier is equal to the source identifier associated with this particular TLC's 510 split lock request, this particular TLC 510 has been chosen as the locker at step 1160.

Figure 12:
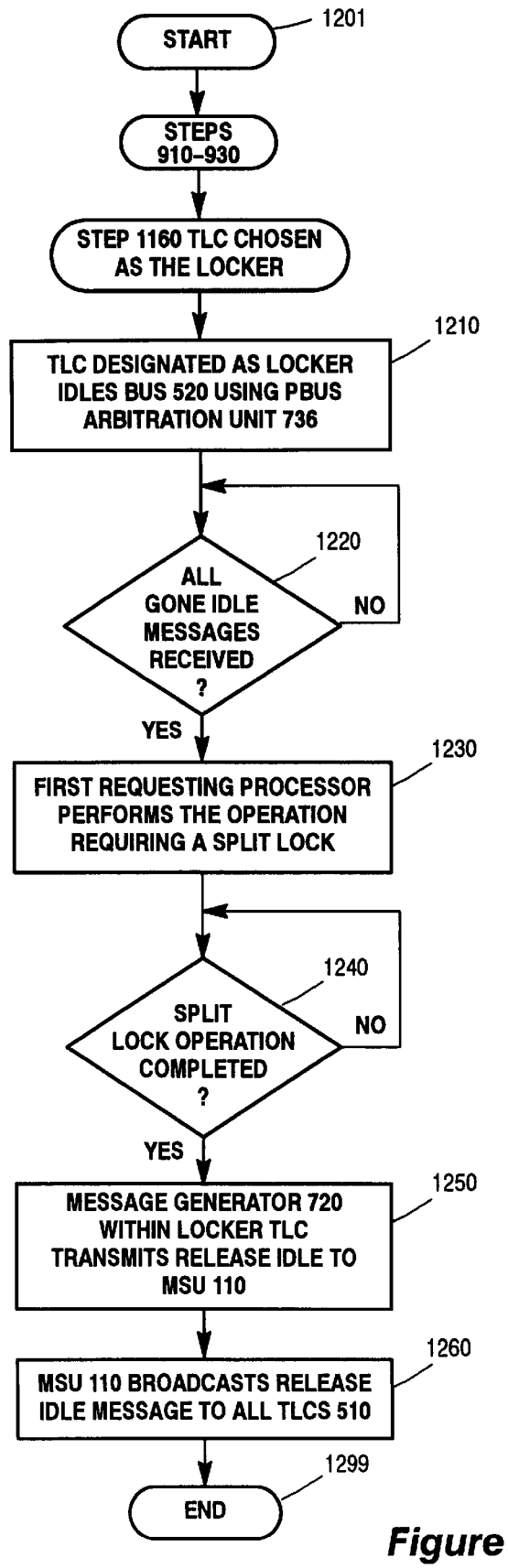
FIG. 12 illustrates a flowchart showing a portion of the split lock operation carried out by a third level cache (TLC) chosen as the locker.

FIG. 12 is a flow chart showing the portion of the split lock operation carried out by the particular TLC 510 chosen as the locker at step 1140. In a step 1210, the particular TLC 510 designated as the locker idles bus 520 using Pbus arbitration unit 736. In a decision step 1220, the locker waits to receive a gone idle message from each TLC 510 that was not chosen as the locker. In a step 1230, the locker allows the particular processor 540 that was granted the split lock request to proceed with the operation that requires a split lock operation.

In a decision step 1240, the locker waits for processor 540 to complete the operation allowed in step 1230. In a step 1250, the locker transmits the release idle message to MSU 110 using message generator 720. In a step 1260, MSU 110 broadcasts the release idle message to all TLCs 510.

Figure 13:
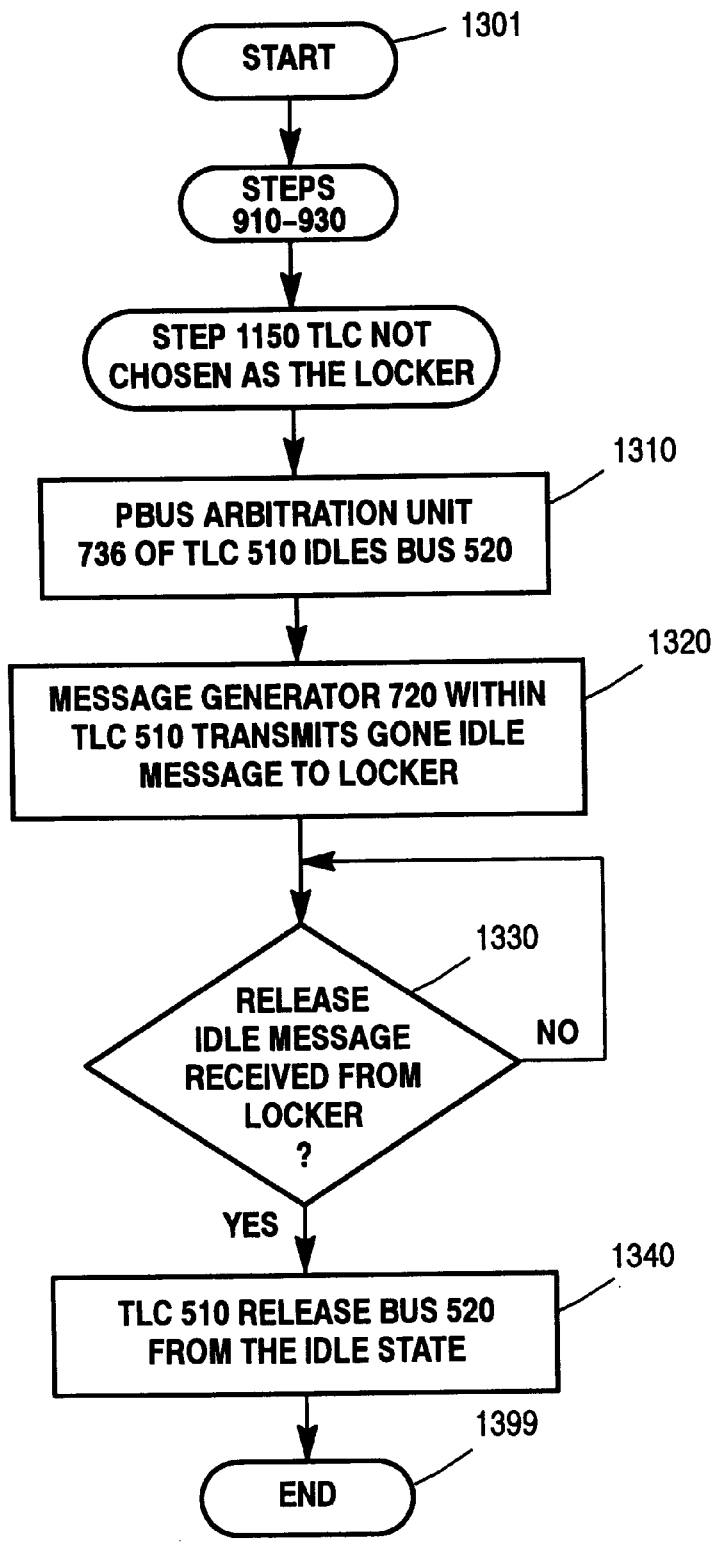
FIG. 13 illustrates a flowchart showing a portion of the split lock operation carried out by a third level cache (TLC) not chosen as the locker.

FIG. 13 is a flow chart showing the portion of the split lock operation carried out by TLC 510 not chosen to be the locker at step 1150. In a step 1310, Pbus arbitration unit 736 causes bus 520 to become idle. Once bus 520 is idle, no operations can take place on bus 520 without TLC's 510 consent. In a step 1320, message generator 720 transmits the gone idle message to the locker. The gone idle message contains the source identifier of each TLC 510 that transmits the gone idle message.

In a decision step 1330, all TLCs 510 that were not chosen to be the locker wait to receive the release idle message from the locker. When a release idle message is received from the locker, processing continues at a step 1340, where TLC 510 releases bus 520 from the idle state.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for avoiding deadlocks while performing non-atomic operations in a computer caching system including a main memory, at least one cache coupled to the main memory, and a plurality of processors coupled to each at least one cache, the method comprising:

sending, by a requesting processor to a cache associated with said requesting processor, a split lock request indicating that said requesting processor desires to perform a non-atomic operation in the main memory;

sending, by said cache associated with said requesting processor, a lock message to the main memory in response to said split lock request;

sending, by the main memory in response to said lock message, a grant message that identifies a locking processor for which the main memory grants said split lock request; and changing to an idle state in response to said grant message each bus coupled to each of the plurality of processors not identified as said locking processor.

2. The method of claim 1, further comprising, after said step of sending a grant message, the step of:

performing, by a locking processor, a non-atomic operation.

3. The method of claim 2, further compromising the step of:

sending, by a cache associated with said locking processor, a release idle message upon a completion of a non-atomic operation to each of the plurality of processors not identified as said locking processor.

4. The method of claim 3, wherein said step of sending a release idle message further comprises the steps of:

sending, by a cache associated with said locking processor, said release idle message to the main memory; and broadcasting, by the main memory in response to said release idle message from said associated cache, said release idle message to each of the plurality of processors not identified as said locking processor.

5. The method of claim 4, wherein said step of sending a release idle message further comprises the step of:

sending, by said locking processor, said release idle message to said associated cache upon completion of a non-atomic operation.

6. The method of claim 4, wherein said step of sending a release idle message further comprises the step of:

detecting, by said associated cache, completion of a non-atomic operation.

7. The method of claim 2, further comprising, before performing a non-atomic operation, the step of:

waiting, by said locking processor, for each of the plurality processors not identified in said grant message to change to said idle state.

8. The method of claim 7, further comprising, before said step of waiting for each of the plurality of processors not identified in said grant message to change to said idle state, the step of:

sending, by each of the plurality of processors not identified in said grant message, a signal to each cache associated with said plurality of processors, said signal indicating a change to said idle state.

9. The method of claim 7, further comprising, before said step of waiting for each of the plurality of processors not identified in said grant message to change to said idle state, the step of:

sending, by each cache associated with the plurality of processors not identified in said grant message, a gone signal message indicating said change to said idle state.

10. The method of claim 9, wherein said step of changing to said idle state comprises:

disabling a data bus, associated with each of the plurality of processors that couples each of the plurality of processors, to each cache.

11. The method of claim 9, wherein said step of changing to said idle state comprises:

disabling a data bus, associated with at least two of the plurality of processors that couples said at least two of the plurality of processors, to each cache.

12. The method of claim 11, wherein said step of disabling a data bus comprises the step of:

disabling, by each cache, an associated data bus.

13. The method of claim 3, further comprising the step of:

waiting, by each cache associated with the plurality of processors not identified in said grant message, for said release idle message.

14. The method of claim 13, further comprising the step of:

changing, by each of the plurality of processors not identified in said grant message, from said idle state to an active state in response to said release idle message.

15. The method of claim 1, further comprising, after said step of sending a split lock request, the step of:

storing, by the main memory, an identifier identifying said requesting processor that generated said split lock request.

16. The method of claim 15, wherein said step of storing an identifier comprises the step of:

storing, by the main memory, an identifier identifying said requesting processor that generated said split lock request in an order in which said lock message was received by the main memory.

17. The method of claim 16, wherein said step of sending a grant message comprises the step of:

sending, by the main memory in response to said split lock request, a grant message, said grant message identifying a locking processor for whom the split lock request is granted, said grant message sent according to the order in which said lock message was received by the main memory.

18. The method of claim 17, wherein said step of sending a grant message further comprises the step of:

sending, by the main memory in response to said split lock request, a grant message to each of the at least one cache, said grant message identifying a locking processor for whom the split lock request is granted, said grant message sent according to the order in which said lock message was received by the main memory.

19. The method of claim 1, further comprising, before said step of sending a split lock request, the step of:

detecting a condition in said requesting processor that said non-atomic operation is desired.

20. The method of claim 19, wherein said step of detecting a condition comprises the step of:

detecting, by a cache associated with said requesting processor, the condition that said non-atomic operation is desired.

21. A processing module for avoiding deadlocks while performing non-atomic operations, the processing module for use in a computer caching system that includes a main memory, the processing module comprising:

a processor that generates a split lock request to perform a non-atomic operation in the main memory; and a cache memory coupled between said processor and the main memory, said cache memory having:

means for generating a lock message to be sent to the main memory in response to said split lock request, said lock message identifying said processor, means for generating a gone idle message indicating that a bus coupling said cache memory to said processor has been placed in an idle state, said bus to be placed in said idle state in response to a grant message received from the main memory that identifies said processor as a non-locking processor, and means for generating a release idle message after completing a non-atomic operation, which is performed in response to a grant message received from the main memory that identifies said processor as a locking processor.

22. The processing module of claim 21, wherein said cache memory further comprises:

means for waiting for all cache memories in the computer caching system associated with said non-locking processor to place their respective buses in said idle state.

23. The processing module of claim 21, wherein said cache memory further comprises:

means for waiting for a cache memory associated with said locking processor to send said release idle message.

24. A system for avoiding a deadlock resulting from the use of non-atomic operations, the system comprising:

a main memory;

at least one cache coupled to said main memory; and a plurality of processors coupled to each said at least one cache;

wherein one of said plurality of processors is a requesting processor having means for generating a split lock request to be sent to a cache associated with said requesting processor, said split lock request indicating that said requesting processor desires to perform a non-atomic operation in said main memory, wherein said cache associated with said requesting processor includes means for generating a locking message to be sent to said main memory in response to said split lock request, said locking message identifying said requesting processor, wherein said main memory includes means for generating a grant message based on said locking message to be sent to each of said at least one cache, said grant message identifying, as a locking processor, one of said plurality of processors for which said main memory grants said split lock request, wherein each cache not associated with said locking processor includes means for generating a gone idle message after a bus associated with that cache is disabled in response to said grant message, and wherein a cache associated with said locking processor includes means for generating a release idle message after said locking processor has completed a non-atomic operation.

25. The system of claim 24, wherein said main memory further includes:

means for storing an identifier that identifies said requesting processor in response to said locking message, said identifier stored according to an order in which said locking message was received; and means for granting said split lock request, said split lock request granted according to the order in which said identifier was stored.

* * * * *